United States Patent
Li et al.

(10) Patent No.: US 7,593,934 B2
(45) Date of Patent: Sep. 22, 2009

(54) LEARNING A DOCUMENT RANKING USING A LOSS FUNCTION WITH A RANK PAIR OR A QUERY PARAMETER

(75) Inventors: Hang Li, Beijing (CN); Jun Xu, Tianjin (CN); Yunbo Cao, Beijing (CN); Tie-Yan Liu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 92 days.

(21) Appl. No.: 11/460,838

(22) Filed: Jul. 28, 2006

(65) Prior Publication Data

US 2008/0027925 A1    Jan. 31, 2008

(51) Int. Cl.
G06F 7/00 (2006.01)
G06F 17/30 (2006.01)
G06F 15/00 (2006.01)

(52) U.S. Cl. ................ 707/5; 707/2; 707/3; 707/8; 707/9; 707/10

(58) Field of Classification Search .......... 707/3–7
See application file for complete search history.

(56) References Cited

U.S. PATENT DOCUMENTS

| | | | |
|---|---|---|---|
| 5,303,330 A | 4/1994 | Gersho et al. | |
| 5,864,846 A * | 1/1999 | Voorhees et al. | 707/5 |
| 6,418,432 B1 | 7/2002 | Cohen et al. | |
| 6,829,605 B2 | 12/2004 | Azzam | |
| 6,845,354 B1 | 1/2005 | Kuo et al. | |
| 6,947,920 B2 | 9/2005 | Alpha | |
| 6,961,914 B1 | 11/2005 | Teig et al. | |
| 7,028,029 B2 | 4/2006 | Kamvar et al. | |
| 7,062,485 B1 | 6/2006 | Jin et al. | |
| 7,107,266 B1 | 9/2006 | Breyman et al. | |
| 7,146,361 B2 * | 12/2006 | Broder et al. | 707/5 |
| 7,197,497 B2 | 3/2007 | Cossock | |

(Continued)

FOREIGN PATENT DOCUMENTS

WO    WO 2005/031604    4/2005

OTHER PUBLICATIONS

"MSN Search Gets Neural Net/RankNet Technology & (Potentially) Awesome New Search Commands," Search Engine Watch.com, 2005, http://blog.searchenginewatch.com/blog/050622-082709.

(Continued)

*Primary Examiner*—Tony Mahmoudi
*Assistant Examiner*—Cecile Vo
(74) *Attorney, Agent, or Firm*—Perkins Coie LLP

(57) ABSTRACT

A method and system for generating a ranking function to rank the relevance of documents to a query is provided. The ranking system learns a ranking function from training data that includes queries, resultant documents, and relevance of each document to its query. The ranking system learns a ranking function using the training data by weighting incorrect rankings of relevant documents more heavily than the incorrect rankings of not relevant documents so that more emphasis is placed on correctly ranking relevant documents. The ranking system may also learn a ranking function using the training data by normalizing the contribution of each query to the ranking function so that it is independent of the number of relevant documents of each query.

8 Claims, 8 Drawing Sheets

U.S. PATENT DOCUMENTS

| | | | |
|---|---|---|---|
| 7,308,496 | B2 | 12/2007 | Yeager et al. |
| 7,328,216 | B2 | 2/2008 | Hofmann et al. |
| 7,386,545 | B2 | 6/2008 | Ashutosh et al. |
| 7,512,602 | B2* | 3/2009 | Broder et al. .................. 707/5 |
| 2002/0161753 | A1 | 10/2002 | Inaba et al. |
| 2002/0174101 | A1 | 11/2002 | Fernley et al. |
| 2003/0110147 | A1 | 6/2003 | Li et al. |
| 2004/0019601 | A1 | 1/2004 | Gates |
| 2004/0111408 | A1* | 6/2004 | Caudill et al. .................. 707/3 |
| 2004/0205079 | A1 | 10/2004 | Azzam |
| 2004/0230577 | A1 | 11/2004 | Kawatani |
| 2004/0260695 | A1 | 12/2004 | Brill |
| 2005/0021517 | A1 | 1/2005 | Marchisio |
| 2005/0060311 | A1 | 3/2005 | Tong et al. |
| 2005/0154723 | A1 | 7/2005 | Liang |
| 2005/0187931 | A1 | 8/2005 | Cofino et al. |
| 2005/0192955 | A1 | 9/2005 | Farrell |
| 2005/0216434 | A1 | 9/2005 | Haveliwala et al. |
| 2005/0289102 | A1 | 12/2005 | Das et al. |
| 2006/0031219 | A1 | 2/2006 | Chernyak et al. |
| 2006/0074910 | A1* | 4/2006 | Yun et al. ...................... 707/7 |
| 2006/0080314 | A1 | 4/2006 | Hubert et al. |
| 2006/0085455 | A1 | 4/2006 | Chmura et al. |
| 2006/0235841 | A1* | 10/2006 | Betz et al. ...................... 707/5 |
| 2006/0242140 | A1 | 10/2006 | Wnek |
| 2007/0083492 | A1 | 4/2007 | Hohimer et al. |
| 2007/0203940 | A1* | 8/2007 | Wang et al. ............. 707/103 R |
| 2008/0027936 | A1* | 1/2008 | Liu et al. ...................... 707/7 |

OTHER PUBLICATIONS

"Using Machine Learning to Improve Information Finding on the Web—Dr. Mehran Sahami," Forum for Artificial Intelligence 2005 Upcoming Talk, http://www.cs.utexas.edu/~ai-lab/fai/2005-spring.html, [last accessed Mar. 8, 2006].

Borlund, Pia, "The Concept of Relevance in IR," Journal of the American Society for Information Science and Technology, 54(10), pp. 913-925, 2003, © 2003 Wiley Periodicals, Inc.

Burges, Chris et al., "Learning to Rank using Gradient Descent," Proceedings of the 22nd International Conference on Machine Learning, Germany, 2005.

U.S. Appl. No. 11/278,508, Liu et al.

Burges, Christopher J.C., "Ranking as Learning Structured Outputs," pp. 7-11, 2005 NIPS Workshop.

Chu, Wei and S. Sathiya Keerthi, "New Approaches to Support Vector Ordinal Regression," Proceedings of the 22nd International Conference on Machine Learning, Germany, 2005, © 2005 by the authors.

Chu, Wei and Zoubin Ghahramani, "Extensions of Gaussian Processes for Ranking: Semi-supervised and Active Learning," 2005 NIPS Workshop.

Chu, Wei and Zoubin Ghahramani, "Gaussian Processes for Ordinal Regression," Journal of Machine Learning Research 6, 2005, pp. 1-48, © 2005 authors.

Crammer, Koby and Yoram Singer, "Pranking with Ranking," NIPS 14, 2002.

Dekel, Ofer, Christopher D. Manning and Yoram Singer, "Log-Linear Models for Label Ranking," NIPS 16, 2004.

Freund, Yoav et al., "An Efficient Boosting Algorithm for Combining Preferences," Journal of Meachine Learning Research 4, 2003, pp. 933-969, © 2003 by authors.

Friedman, Jerome, Trevor Hastie and Robert Tibshirani, "Additive Logistic Regression: a Statistical View of Boosting," Aug. 20, 1998, Department of Statistics, Stanford University Technical Report.

Gao, Jianfeg et al., "Linear Discriminant Model for Information Retrieval," 28th Annual ACM SIGIR Conference, © 2005 ACM.

Google, http://www.google.com, [last accessed Apr. 30, 2007].

Grangier, David and Samy Bengio, "Exploiting Hyperlinks to Learn a Retrieval Model," 2005 NIPS Workshop.

Harrington, Edward F., "Online Ranking / Collaborative filtering using the Perceptron Algorithm," Proceedings of the 20th International Conference on Machine Learning, ICML 2003, Washington DC, pp. 250-257.

Herbrich, Ralf et al., "Large Margin Rank Boundaries for Ordinal Regression," Smola, Bartlett, Scholkopf and Schuurmans: Advances in Large Margin Classifiers, 7, 2000, pp. 115-132.

Hersh, William et al., "Ohsumed: An Interactive Retrieval Evaluation and New Large Test Collection for Research," 1994, Proceedings of the 17th Annual ACM SIGIR Conference, pp. 192-201.

Jarvelin, Kalervo and Jaana Kekalainen, "Cumulated Gain-Based Evaluation of IR Techniques," ACM Transactions on Information Systems, vol. 20, No. 4, Oct. 2002, pp. 422-446.

Jarvelin, Kalervo and Jaana Kekalainen, "IR evaluation methods for retrieving highly relevant documents," Belkin, N.J. Ingwersen, P. and Leong, M. K. (eds.) Proceedings of the 23rd Annual International ACM SIGIR Conference on Research and Development in Information Retrieval, 2000, New York, ACM, pp. 41-48.

Joachims, Thorsten, "Making Large-Scale SVM Learning Practical," 11, Advances in Kernel Methods—Support Vector Learning, B. Scholkopf, C. Burges and A. Smola (ed.), MIT-Press, 1999.

Joachims, Thorsten, "Optimizing Search Engines using Clickthrough Data," SIGKDD 2002, Edmonton, Alberta, Canada, © 2002 ACM.

Lafferty, John and Chengxiang Zhai, "Document Language Models, Query Models, and Risk Minimization for Information Retrieval," SIGIR'01, Sep. 2001, New Orleans, Lousiana, © 2001 ACM, pp. 111-119.

MSN, http://www.msn.com, [last accessed Apr. 30, 2007].

Nallapati, Ramesh, "Discriminative Models for Information Retrieval," SIGIR'04, Jul. 2004, Sheffield, South Yorkshire, UK, © 2004 ACM.

Ponte, Jay M. and W. Bruce Croft, "A Language Modeling Approach to Information Retrieval," SIGIR 1998 Melbourne, Australia © 1998 ACM.

Rajaram, Shyamsundar and Shivani Agarwal, "Generalization Bounds for k-Partite Ranking," 2005 NIPS Workshop.

Robertson, S.E. and S. Walker, "Some Simple Effective Approximations to the 2-Poisson Model for Probabilistic Weighted Retrieval," 1994, 17th Annual International ACM SIGIR Conference on Research and Development in Information Retrieval.

Robertson, Stephen and David A. Hull, "The TREC-9 Filtering Track Final Report," 9th Text Retrieval Conference, 2000.

Saar-Tsechansky, Maytal and Foster Provost, "Active Learning for Decision-Making," Nov. 2004, Working Paper CeDER-04-06, Stern School of Business, New York, http://misrc.umn.edu/workshops/2005/spring/maytal.pdf, [last accessed May 10, 2007].

Saar-Tsechansky, Maytal and Foster Provost, "Active Sampling for Class Probability Estimation and Ranking," Machine Learning, http://pages.stern.nyu.edu/~ fprovost/Papers/MLJ-BLV.pdf, [last accessed May 10, 2007].

Shashua, Amnon and Anat Levin, "Taxonomy of Large Margin Principle Algorithms for Ordinal Regression Problems," Advances in Neural Information Processing Systems 15, Cambridge, MA, 2000, MIT Press.

Silverstein, Craig et al., "Analysis of a Very Large AltaVista Query Log," SRC Technical Note 1998-014, Oct. 26, 1998, digital Systems Research Center, © Digital Equipment Corporation 1998.

Sormunen, Eero, "Liberal Relevance Criteria of TREC—Counting on Negligible Documents?," SIGIR'02, 2002, Tampere, Finland, © 2002 ACM.

Spink, Amanda et al, "From E-Sex to E-Commerce: Web Search Changes," Computer, Web Technologies, Mar. 2002, pp. 107-109.

Spink, Amanda et al., "Searching the Web: The Public and Their Queries," Journal of the American Society for Information Science and Technology, 52(3), Feb. 1, 2001, © 2001 John Wiley & Sons, Inc., pp. 226-234.

Usunier, Nicolas et al., "Ranking with unlabeled Data: A first study," 2005 NIPS Workshop.

Weiss, Gary M. And Foster Provost, "Learning When Training Data are Costly: The Effect of Class Distribution on Tree Induction," Journal of Artificial Intelligence Research, 19, 2003, pp. 315-354, © 2003 Al Access Foundation and Morgan Kaufmann Publishers.
Yahoo, http://www.yahoo.com, [last accessed Apr. 30, 2007].
Yu, Shipeng, Kai Yu and Volker Tresp, "Collaborative Ordinal Regression," pp. 35-40, 2005 NIPS Workshop.

U.S. Patent Office Final Office Action under U.S. Appl. No. 11/278,508 dated Jun. 23, 2008, 22 pages.

U.S. Patent Office Non-Final Office Action under U.S. Appl. No. 11/278,508 dated Dec. 10, 2007, 15 pages.

* cited by examiner

LEARNING A DOCUMENT RANKING USING A LOSS FUNCTION WITH A RANK PAIR OR A QUERY PARAMETER

BACKGROUND

Many search engine services, such as Google and Overture, provide for searching for information that is accessible via the Internet. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service identifies web pages that may be related to the search request based on how well the keywords of a web page match the words of the query. The search engine service then displays to the user links to the identified web pages in an order that is based on a ranking that may be determined by their relevance to the query, popularity, importance, and/or some other measure.

The success of the search engine service may depend in large part on its ability to rank web pages in an order that is most relevant to the user who submitted the query. Search engine services have used many machine learning techniques in an attempt to learn a good ranking function. The learning of a ranking function for a web-based search is quite different from traditional statistical learning problems such as classification, regression, and density estimation. The basic assumption in traditional statistical learning is that all instances are independently and identically distributed. This assumption, however, is not correct for web-based searching. In web-based searching, the rank of a web page of a search result is not independent of the other web pages of the search result, but rather the ranks of the web pages are dependent on one another.

Several machine learning techniques have been developed to learn a more accurate ranking function that factors in the dependence of the rank of one web page on the rank of another web page. For example, a RankSVM algorithm, which is a variation of a generalized Support Vector Machine ("SVM"), attempts to learn a ranking function that preserves the pairwise partial ordering of the web pages of training data. A RankSVM algorithm is described in Joachims, T., "Optimizing Search Engines Using Clickthrough Data," Proceedings of the ACM Conference on Knowledge Discovery and Data Mining ("KDD"), ACM, 2002. Another example of a technique for learning a ranking function is a RankBoost algorithm. A RankBoost algorithm is an adaptive boosting algorithm that, like a RankSVM algorithm, operates to preserve the ordering of pairs of web pages. A RankBoost algorithm is described in Freund, Y., Iyer, R., Schapire, R., and Singer, Y., "An Efficient Boosting Algorithm for Combining Preferences," Journal of Machine Learning Research, 2003 (4). As another example, a neural network algorithm, referred to as RankNet, has been used to rank web pages. A RankNet algorithm also operates to preserve the ordering of pairs of web pages. A RankNet algorithm is described in Burges, C., Shaked, T., Renshaw, E., Lazier, A., Deeds, M., Hamilton, N., and Hullender, G., "Learning to Rank Using Gradient Descent," 22nd International Conference on Machine Learning, Bonn, Germany, 2005.

These machine learning techniques attempt to learn a ranking function by operating on document (e.g., web page) pairs to minimize an error function between these pairs. In particular, these techniques learn a ranking function that will correctly rank as many document pairs as possible. The objective of correctly ranking as many document pairs as possible will not in general, however, lead to an accurate ranking function. For example, assume that two queries $q_1$ and $q_2$ have 40 and 5 documents, respectively, in their search results. A complete pairwise ordering for query $q_1$ will specify the ordering for 780 pairs, and a complete pairwise ordering for query $q_2$ will specify the ordering for 10 pairs. Assume the ranking function can correctly rank 780 out of the 790 pairs. If 770 pairs from query $q_1$ and the 10 pairs from query $q_2$ are correctly ranked, then the ranking function will likely produce an acceptable ranking for both queries. If, however, 780 pairs from query $q_1$ are ranked correctly, but no pairs from query $q_2$ are ranked correctly, then the ranking function will produce an acceptable ranking for query $q_1$, but an unacceptable ranking for query $q_2$. In general, the learning technique will attempt to minimize the total error for pairs of documents across all queries by summing the errors for all pairs of documents. As a result, the ranking function will be more accurate at ranking queries with many web pages and less accurate at ranking queries with few web pages. Thus, these ranking functions might only produce acceptable results if all the queries of the training data have approximately the same number of documents. It is, however, extremely unlikely that a search engine would return the same number of web pages in the search results for a collection of training queries.

Because these machine learning techniques attempt to correctly rank as many documents as possible, they tend to expend as much effort on correctly ranking documents classified as relevant as correctly ranking documents classified as not relevant. The relevance classifications of documents may be relevant, partially relevant, and irrelevant. Users who submit queries will frequently select the top ranked documents for review and will only infrequently select partially relevant and irrelevant documents. If an irrelevant document has a high ranking, then the user may become dissatisfied with the search engine service that provided and ranked the documents of the search result. Similarly, if a relevant document has a low ranking, the user may also become dissatisfied because the user may not be able to find that relevant document because it may appear many pages into the display of the search result.

SUMMARY

A method and system for generating a ranking function to rank the relevance of documents to a query is provided. The ranking system learns a ranking function from training data that includes queries, resultant documents, and relevance of each document to its query. The ranking system learns a ranking function using the training data by weighting incorrect rankings of relevant documents more heavily than the incorrect rankings of not relevant documents so that more emphasis is placed on correctly ranking relevant documents. The ranking system may alternatively learn a ranking function using the training data by normalizing the contribution of each query to the ranking function by factoring in the number of resultant documents of each query. As a result, the ranking function will reflect a similar contribution made by each query regardless of the number of documents in the query result. The ranking system may either weight the ranking of relevant documents more heavily or normalize the contribution of a query based on number of documents when generating a ranking function, or use both in combination.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
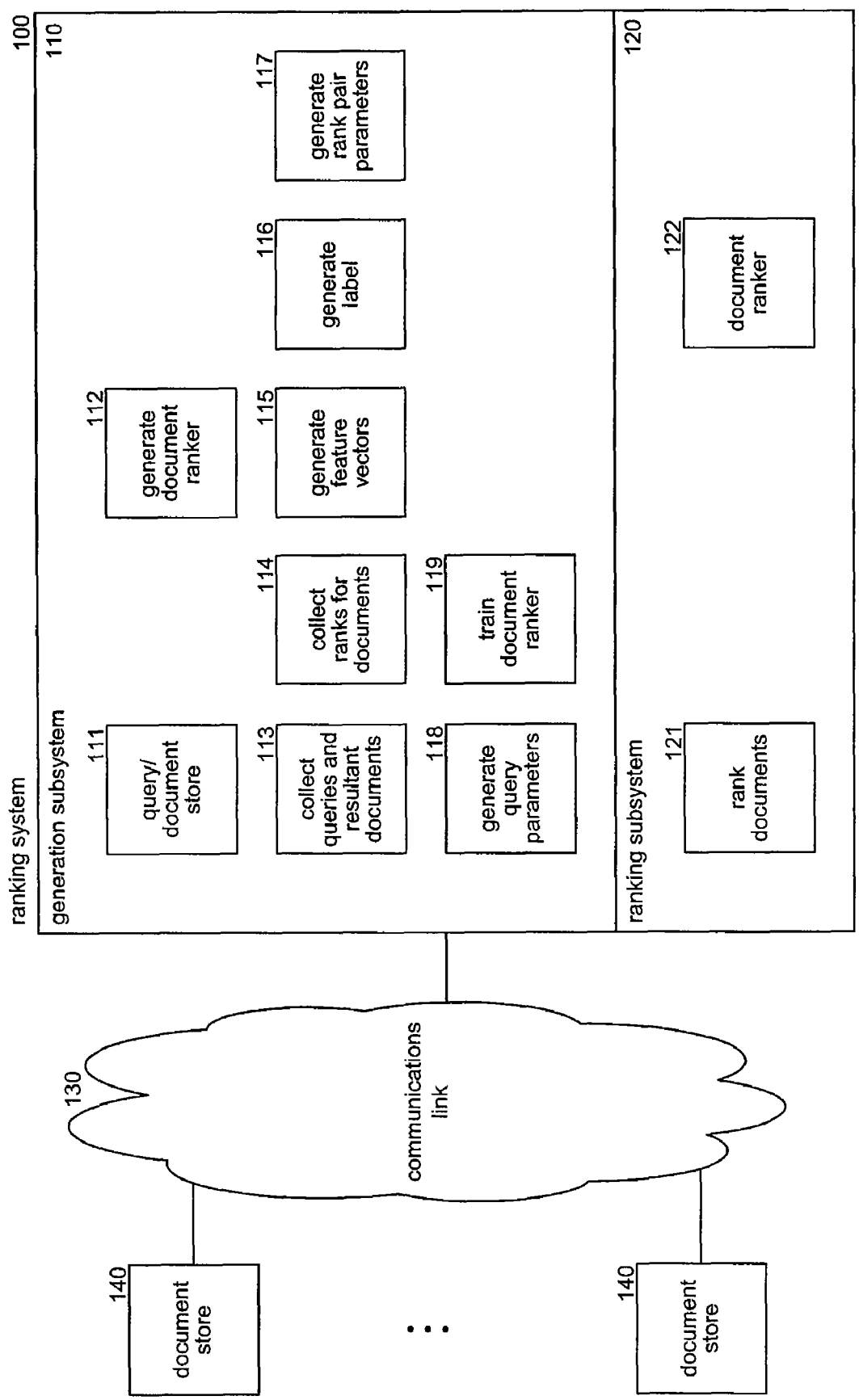
FIG. 1 is a block diagram that illustrates components of the ranking system in one embodiment.

A method and system for generating a ranking function to rank the relevance of documents to a query is provided. In one embodiment, the ranking system learns a ranking function from a collection of queries, resultant documents, and relevance of each document to its query. For example, the queries may be submitted to a web-based search engine to identify the resultant documents that may satisfy the query. The ranking system then determines the relevance of each resultant document to its query. For example, the ranking system may input from a user the relevance of each document to its query. The queries, documents, and relevances are the training data that the ranking system uses to learn the ranking function. The ranking system learns a ranking function using the training data by weighting incorrect rankings of relevant documents more heavily than the incorrect rankings of not relevant documents so that more emphasis is placed on correctly ranking relevant documents. For example, the ranking system may adjust a loss or error function so that more emphasis is placed on minimizing the error in the ranking function's ranking of relevant documents and less emphasis is placed on the error in the ranking function's ranking of not relevant documents. As a result, the ranking function will more correctly rank relevant documents than it does irrelevant documents. In one embodiment, the ranking system may alternatively learn a ranking function using the training data by normalizing the contribution of each query to the ranking function by factoring in the number of resultant documents (e.g., relevant documents) of each query. As a result, the ranking function will reflect contributions made by each query in a way that is independent of the number of resultant documents. The ranking system may either weight the ranking of relevant documents more heavily or normalize the contribution of a query based on number of documents when generating a ranking function, or use both in combination as described below. As a result, the ranking system can generate a ranking function that results in a ranking that is more desired by typical users of a search engine.

In one embodiment, the ranking system generates a ranking function using training data derived from queries and resultant documents that may be collected by submitting the queries to search engines. The ranking system then inputs a ranking of the relevance of each document to its query. For example, the ranking system may prompt a user to indicate the relevance classification, such as relevant, partially relevant, or irrelevant, indicating the relevance of each document to its query. The ranking system generates a feature vector for each document. The feature vector includes features that are useful for determining the relevance of a document to a query. For example, the feature vector may include a count of the number of times a term of the query occurs in the document, the number of terms in the document, and so on. The ranking system generates a label for ordered pairs of documents with different relevance classifications for each query. For example, a pair of documents may include one relevant document (r) and one irrelevant document (i) resulting in two ordered pairs: (r,i) and (i,r). Thus, if a query has 10 documents with 2 documents being relevant, 3 documents being partially relevant, and 5 documents being irrelevant, then the query has 62 pairs (i.e., 2*(2*3+2*5+3*5)). Each ordered pair is also referred to as an instance pair. The ranking system then generates a label for each instance pair indicating whether the ranking of the documents within the instance pair is correct. For example, the ranking of (r,i) is correct assuming the higher ranking document is first in the pair. If so, then the ranking of (i,r) is incorrect.

In one embodiment, the ranking system uses a rank pair parameter for each pair of relevance classifications. The relevance classification pairs (or ranking pairs) are (relevant, partially relevant), (partially relevant, relevant), (relevant, irrelevant), and so on. The rank pair parameter for a ranking pair indicates a weighting for errors in the learning of the ranking function attributable to instance pairs corresponding to that ranking pair. For example, an error in ranking a (relevant, irrelevant) instance pair will be weighted more heavily than an error in ranking a (partially relevant, irrelevant) instance pair because an incorrect ranking of a relevant document is very undesirable whereas the incorrect ranking of a partially relevant document as irrelevant will probably not be noticed by the user. By weighting errors according to the rank pair parameters, the ranking system generates a ranking function that will more likely generate the correct rankings for relevant documents than for not relevant documents generated by switching documents between the relevance classifications of the rank pair. The rank pair parameters may be specified manually or may be generated automatically. In one embodiment, the ranking system generates the ranking pair parameters automatically by calculating an evaluation measure of the perfect ranking of documents for a query and calculating evaluation measures for various not perfect rankings of the documents. The ranking system may perform these calculations for each query and then use the average of the differences between the perfect evaluation measure and the not perfect evaluation measures as the rank pair parameter. The ranking system may use various evaluation measurements such as mean reciprocal rank, winner take all, mean average precision, and normalized discounted cumulative gain.

In one embodiment, the ranking system uses a query parameter for each query to normalize the contribution of the queries to the generation of the ranking function. The ranking system may generate a query parameter for a query based on the number of resultant documents of that query relative to the maximum number of resultant documents of a query of the collection. The ranking system may set the query parameter of a query to the maximum number of resultant documents divided by the number of resultant documents for the query. The ranking system may more specifically set the query parameter of a query to the maximum number of instance pairs of a query divided by the number of instance pairs of the query, which are derived based on the relevance classifications of the pairs of documents.

The ranking system generates the ranking function using various training techniques such as gradient descent or quadratic programming. When gradient descent is used, the ranking system iteratively adjusts weighting parameters for the feature vector used by the ranking function until the error in the ranking function as applied to the training data converges on a solution. During each iteration, the ranking system applies the ranking function with current weighting parameters to each instance pair. If the ranking is incorrect, the ranking function then calculates an adjustment for the current weighting parameters. That adjustment factors in the rank pair parameter and the query parameter as discussed above. At the end of each iteration, the ranking system calculates new current weighting parameters.

The ranking system may represent documents in an input space $X \in R^n$ where n represents the number of features of a feature vector and may represent rankings (or categories) of the documents in an output space of relevance classifications $Y=\{r_1, r_2, \ldots, r_q\}$ where q represents the number of ranks (e.g., relevant, partially relevant, and irrelevant). The ranking system may be implemented using a number of ranks selected based on the goals of the ranking system. A total order between the ranks may be represented as $r_q \succ r_{q-1} \succ \ldots \succ r_1$, where $\succ$ denotes a ranking relationship. The ranking system learns a ranking function out of a set of possible ranking functions $f \in F$ that each determine the ranking relationship between an instance pair as represented by the following equation:

$$\vec{x}_i \succ \vec{x}_j \Leftrightarrow f(\vec{x}_i) > f(\vec{x}_j) \quad (1)$$

where $\vec{x}_i$ represents the feature vector for document i. The ranking system uses as training data a set of ranked instances $S=\{(\vec{x}_i, y_i)\}_{i=1}^t$ from the space $X \times Y$. The ranking system may generate a linear or non-linear ranking function. A linear ranking function is represented by the following equation:

$$f_{\vec{w}}(\vec{x}) = \langle \vec{w}, \vec{x} \rangle \quad (2)$$

where $\vec{w}$ denotes a vector of weighting parameters and $\langle .,. \rangle$ represents an inner product. By substituting Equation 2 into Equation 1, the resulting equation is represented by the following equation:

$$\vec{x}_i \succ \vec{x}_j \Leftrightarrow \langle \vec{w}, \vec{x}_i - \vec{x}_j \rangle > 0 \quad (3)$$

The relationship $\vec{x}_i \succ \vec{x}_j$ between instance pairs $\vec{x}_i$ and $\vec{x}_j$ is expressed by a new vector $\vec{x}_i - \vec{x}_j$. The ranking system creates the new vector and a label for each instance pair as represented by the following equation:

$$\left(\vec{x}^{(1)} - \vec{x}^{(2)}, z = \begin{cases} +1 & y^{(1)} \succ y^{(2)} \\ -1 & y^{(2)} \succ y^{(1)} \end{cases}\right) \quad (4)$$

where $\vec{x}^{(1)}$ and $\vec{x}^{(2)}$ represent the first and second documents and $y^{(1)}$ and $y^{(2)}$ represent their ranks. From the given training data set S, the ranking system creates a new training data set S' containing labeled vectors as represented by the following equation:

$$S' = \{\vec{x}_i^{(1)} - \vec{x}_i^{(2)}, z_i\}_{i=1}^l \quad (5)$$

where l represents the number of instance pairs. The ranking system then generates an SVM model from the new training data S' to assign either positive label z=+1 or negative label z=−1 to any vector $\vec{x}_i^{(1)} - \vec{x}_i^{(2)}$. The constructing of the SVM model is equivalent to solving a quadratic optimization problem as represented by the following equation:

$$\min_{\vec{w}} L(\vec{w}) = \sum_{i=1}^{l} \tau_{k(i)} \mu_{q(i)} [1 - z_i \langle \vec{w}, \vec{x}_i^{(1)} - \vec{x}_i^{(2)} \rangle] + \lambda \|\vec{w}\|^2 \quad (6)$$

where k(i) represents the type of ranks of instance pair i, $\tau_{k(i)}$ represents the rank pair parameter for k(i), q(i) represents the query of instance pair i, $\mu_{q(i)}$ represents the query parameter for q(i), and $\lambda \|\vec{w}\|^2$ is a regularizer. The ranking system represents a penalty for the $i^{th}$ pair being incorrectly ranked as the product of $\tau_{k(i)}$ and $\mu_{q(i)}$.

The ranking system can solve for the loss function of Equation 6 using a gradient descent algorithm. The loss function can be represented by the following equation:

$$L(\vec{w}) = \sum_{i=1}^{l} l_i(\vec{w}) + \lambda \|\vec{w}\|^2, \quad (7)$$

where $l_i(\vec{w}) = \tau_{k(i)} \mu_{q(i)} [1 - z_i \langle \vec{w}, \vec{x}_i^{(1)} - \vec{x}_i^{(2)} \rangle]_+$ Equation 7 can be differentiated with respect to $\vec{w}$ as represented by the following equation:

$$\frac{\partial L}{\partial \vec{w}} = \sum_{i=1}^{l} \frac{\partial l_i(\vec{w})}{\partial \vec{w}} + 2\lambda \vec{w}, \quad (8)$$

where $$\frac{\partial l_i(\vec{w})}{\partial \vec{w}} = \begin{cases} 0 & \text{if } z_i \langle \vec{w}, \vec{x}_i^{(1)} - \vec{x}_i^{(2)} \rangle \geq 1 \\ -z_i \tau_{k(i)} \mu_{q(i)} (\vec{x}_i^{(1)} - \vec{x}_i^{(2)}) & \text{if } z_i \langle \vec{w}, \vec{x}_i^{(1)} - \vec{x}_i^{(2)} \rangle < 1 \end{cases}$$

The iteration equations of the gradient descent method may be represented by the following equations:

$$\vec{w}^{(k+1)} = \vec{w}^{(k)} + \eta_k \Delta \vec{w}^{(k)} \quad (9)$$

$$\Delta \vec{w}^{(k)} = -\nabla L(\vec{w}^{(k)}) = -\sum_{i=1}^{l} \frac{\partial l_i(\vec{w}^{(k)})}{\partial \vec{w}} - 2\lambda \vec{w}^{(k)}$$

$$\eta_k : L(\vec{w}^{(k)} + \eta_k \Delta \vec{w}^{(k)}) = \min_{\eta \geq 0} L(\vec{w}^{(k)} + \eta \Delta \vec{w}^{(k)})$$

At each iteration, the ranking system reduces the cost function along its descent direction as represented by Equation 8. To determine the step size of each iteration, the ranking system conducts a line search along the descent direction as described by Equations 9. The ranking system may calculate a learning factor $\eta_k$ to control the learning rate at each iteration k. In one embodiment, rather than calculating each $\eta_k$ at each iteration, the ranking system uses a fixed learning factor.

The ranking system alternatively can solve for the loss function of Equation 6 using a quadratic programming algorithm. The loss function can be represented as a quadratic optimization problem as represented by the following equation:

$$\min_{\vec{w}} M(\vec{w}) = \frac{1}{2} \|\vec{w}\|^2 + \sum_{i=1}^{l} C_i \cdot \xi_i \quad (10)$$

$$\text{subject to } \xi_i \geq 0, \; z_i \langle \vec{w}, \vec{x}_i^{(1)} - \vec{x}_i^{(2)} \rangle \geq 1 - \xi_i \;\; i = 1, \ldots, l$$

$$\text{where } C_i = \frac{\tau_{k(i)} \mu_{q(i)}}{2\lambda}.$$

The corresponding Lagrange function can be represented by the following equation:

$$L_P = \frac{1}{2} \|\vec{w}\|^2 + \sum_{i=1}^{l} C_i \cdot \xi_i - \quad (11)$$

$$\sum_{i=1}^{l} \alpha_i [z_i \langle \vec{w}, \vec{x}_i^{(1)} - \vec{x}_i^{(2)} \rangle - (1 - \xi_i)] - \sum_{i=1}^{l} \mu_i \xi_i$$

The goal is to minimize $L_p$ with respect to $\vec{w}$ and $\xi_i$. Setting their derivatives to zero results in the following equations:

$$\vec{w} = \sum_{i=1}^{l} \alpha_i z_i (\vec{x}_i^{(1)} - \vec{x}_i^{(2)}) \quad (12)$$

$$\alpha_i = C_i - \mu_i \; i = 1, \ldots, l \quad (13)$$

along with the positive constraints $\alpha_i, \mu_i, \xi_i$ i=1, . . . , l. The substitution of Equations 12 and 13 into Equation 11 can be represented by the following equation:

$$L_D = \sum_{i=1}^{l} \alpha_i - \frac{1}{2} \sum_{i=1}^{l} \sum_{i'=1}^{l} \alpha_i \alpha_{i'} z_i z_{i'} \langle \vec{x}_i^{(1)} - \vec{x}_i^{(2)}, \vec{x}_{i'}^{(1)} - \vec{x}_{i'}^{(2)} \rangle \quad (14)$$

The goal is to maximize $L_D$ subject to the constraints represented by the following equation:

$$0 \leq \alpha_i \leq C_i \; i=1, \ldots, l \quad (15)$$

FIG. 1 is a block diagram that illustrates components of the ranking system in one embodiment. The ranking system 100 may be connected to various document stores 140 via communications link 130. A document store may include a search engine service for searching for documents within the store. Alternatively, a search engine may be external to the document store (e.g., a search engine for searching web pages). The ranking system includes a generation subsystem 110 and a ranking subsystem 120. The generation subsystem is used to learn the ranking function. The generation subsystem includes a generate document ranker component 112 that inputs queries and resultant documents from the query/document store 111 and trains a document ranker. The generate document ranker component invokes a collect queries and resultant documents component 113, a collect ranks for documents component 114, a generate feature vectors component 115, a generate labels component 116, a generate rank pair parameters component 117, a generate query parameters component 118, and a train document ranker component 119, which are described below in more detail. The ranking subsystem component includes a rank documents component 121 and a document ranker component 122. The rank documents component receives a query and resultant documents and generates a ranking of the relevance of the resultant documents to the query. The rank documents component invokes the document ranker component that was trained by the generation subsystem.

The computing devices on which the ranking system may be implemented may include a central processing unit, memory, input devices (e.g., keyboard and pointing devices), output devices (e.g., display devices), and storage devices (e.g., disk drives). The memory and storage devices are computer-readable storage medium that may contain instructions that implement the ranking system. In addition, the data structures and message structures may be stored or transmitted via a data transmission medium, such as a signal on a communications link. Various communications links may be used, such as the Internet, a local area network, a wide area network, or a point-to-point dial-up connection.

The ranking system may be implemented on various computing systems or devices including personal computers, server computers, multiprocessor systems, microprocessor-based systems, network PCs, minicomputers, mainframe computers, distributed computing environments that include any of the above systems or devices, and the like. The ranking system may also provide its services (e.g., ranking of search results using the ranking function) to various computing systems such as personal computers, cell phones, personal digital assistants, consumer electronics, home automation devices, and so on.

The ranking system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the training component may be implemented on a computer system separate from the computer system that collects the training data or the computer system that uses the ranking function to rank search results.

Figure 2:
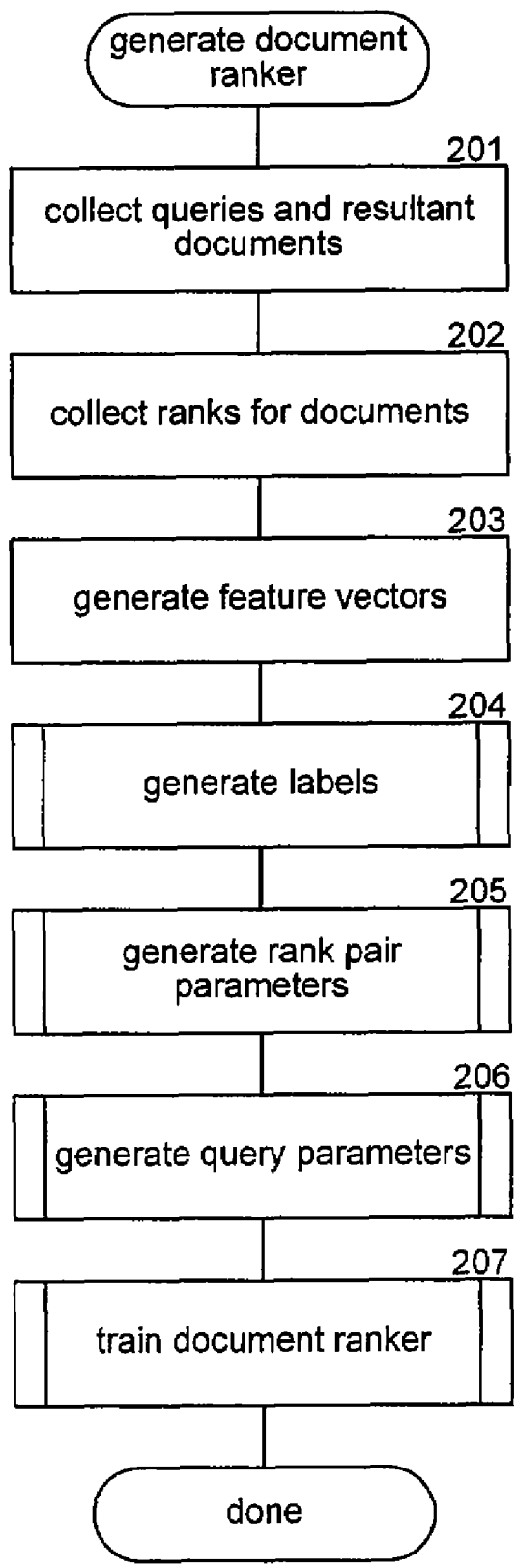
FIG. 2 is a flow diagram illustrating the processing of the generate document ranker component of the ranking system in one embodiment.

FIG. 2 is a flow diagram illustrating the processing of the generate document ranker component of the ranking system in one embodiment. The component is invoked to generate a document ranker component that is used to rank the relevance of documents to queries. In block 201, the component collects the queries and resultant documents. The queries and resultant documents may be collected by submitting queries to various search engine services and storing the queries and resultant documents in the query/documents store. In block 202, the component collects ranks for the documents indicating the relevance of each document to its query. The component may collect the ranks from a person who manually determines the ranking of the documents of each query. In block 203, the component generates the feature vectors for each document of each query. In block 204, the component invokes the generate labels component to generate a label indicating whether each instance pair represents a correct relationship between the documents of the instance pair. In block 205, the component invokes the generate rank pair parameters component to generate a rank pair parameter for each rank pair. In block 206, the component invokes the generate query parameters component to generate a query parameter for each query. In block 207, the component invokes the train document ranker component to train a document ranker to rank documents and then completes.

Figure 3:
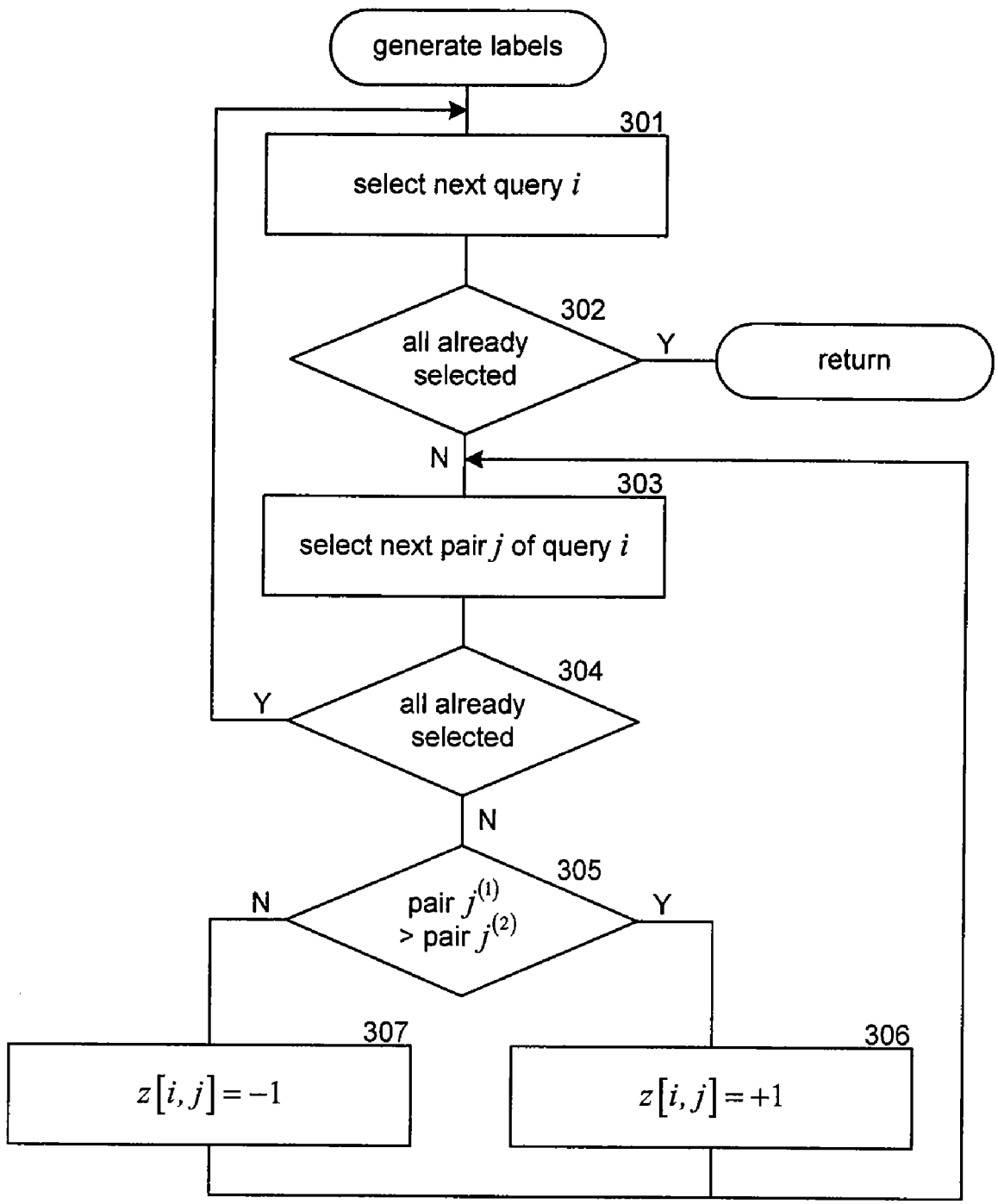
FIG. 3 is a flow diagram that illustrates the processing of the generate labels component of the ranking system in one embodiment.

FIG. 3 is a flow diagram that illustrates the processing of the generate labels component of the ranking system in one embodiment. The component loops selecting each query and selecting each instance pair for the selected query and sets its label to indicate whether the ranking of the pair is correct. In block 301, the component selects the next query. In decision block 302, if all the queries have already been selected, then the component returns, else the component continues at block 303. In block 303, the component selects the next instance pair for the selected query. In decision block 304, if all the instance pairs have already been selected, then the component loops to block 301 to select the next query, else the component continues at block 305. In block 305, if the ordering of the documents of the instance pair is correct, then the component continues at block 306 to set the label to positive one, else the component continues at block 307 to set the label to negative one. The component then loops to block 303 to select the next instance pair for the selected query.

Figure 4:
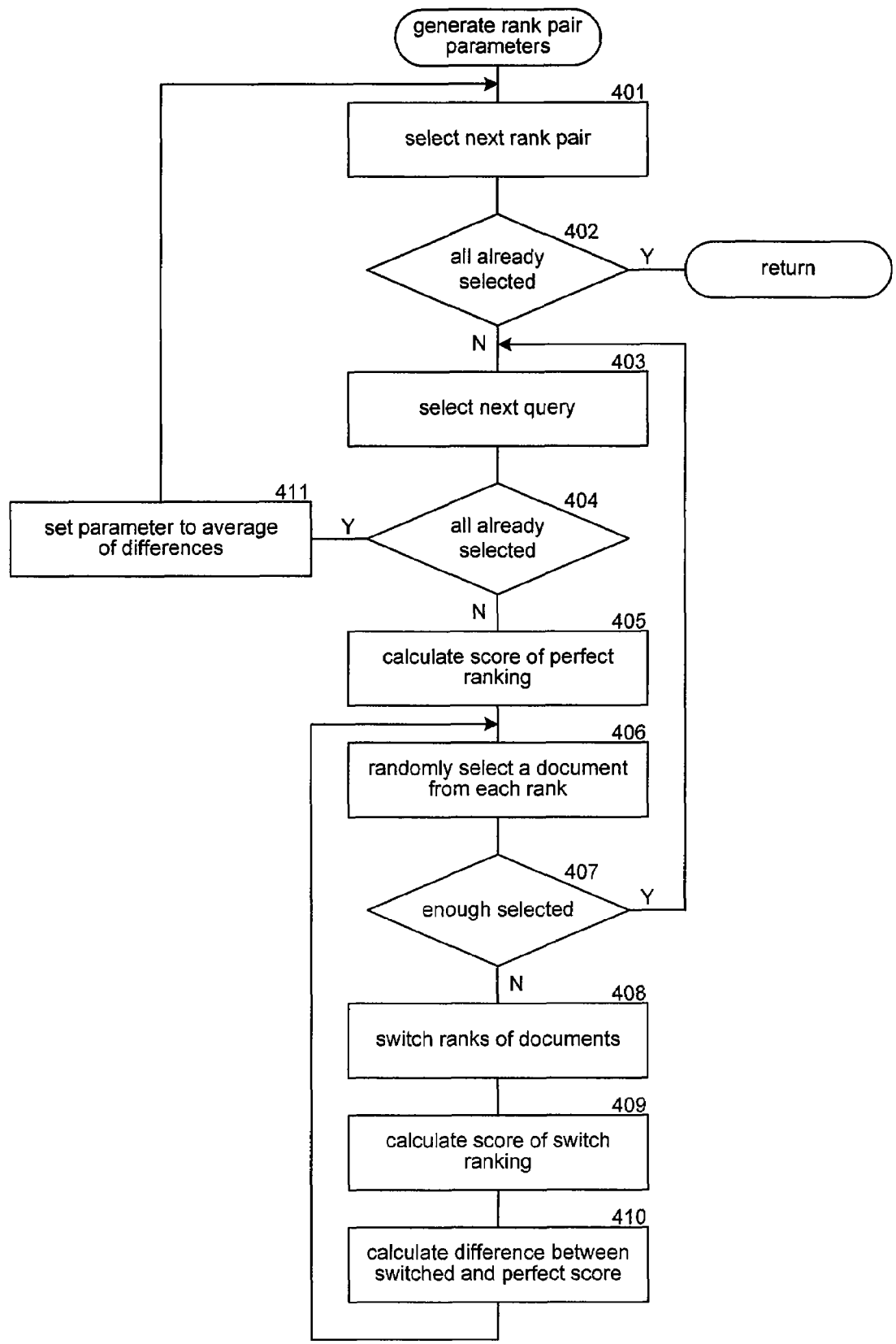
FIG. 4 is a flow diagram that illustrates the processing of the generate rank pair parameters component of the ranking system in one embodiment.

FIG. 4 is a flow diagram that illustrates the processing of the generate rank pair parameters component of the ranking system in one embodiment. The component generates a rank pair parameter for each possible pair of ranking or relevance classifications. The rank pair parameters are used to weight a loss function so that relevant documents are more correctly ranked than not relevant documents. In block 401, the component selects the next rank pair. In decision block 402, if all the rank pairs have already been selected, then the component returns, else the component continues at block 403. In blocks 403-410, the component loops selecting each query and calculating the difference between a perfect ranking of the documents of the query and various random selected rankings of the documents. In block 403, the component selects the next query. In decision block 404, if all the queries have already been selected, then the component continues at block 411, else the component continues at block 405. In block 405, the component calculates an evaluation measure of the perfect ranking. In block 406, the component randomly selects a document from each rank of the selected rank pair. In decision block 407, if enough not perfect rankings have already been selected to provide an accurate rank pair parameter, then the component loops to block 403 to select the next query, else the component continues at block 408. The component may determine that enough have already been selected when the average difference converges on a solution. In block 408, the component switches the ranks of the selected documents. In block 409, the component calculates an evaluation measurement for the switched ranking. In block 410, the component calculates the difference between the switched and perfect evaluation measures and then loops to block 406 to select documents from each rank. In block 411, the component sets the rank pair parameter for the selected rank pair to the average of the differences as calculated in block 410. One skilled in the art will appreciate that many different techniques can be used to generate the rank pair parameters. For example, a user could manually indicate an evaluation measurement, a user could directly indicate the rank pair parameters, and so on.

Figure 5:
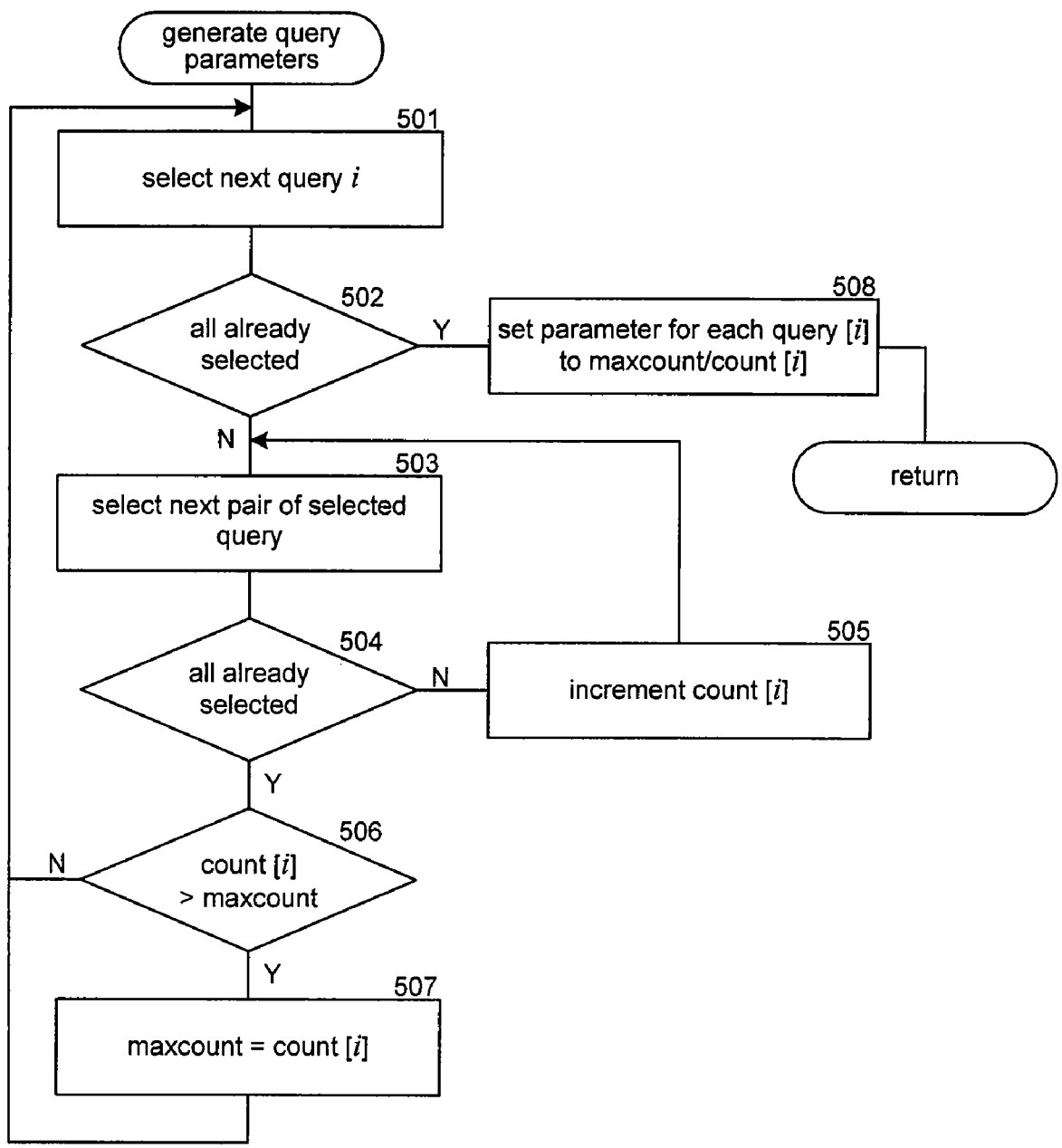
FIG. 5 is a flow diagram illustrating the processing of the generate query parameters component of the ranking system in one embodiment.

FIG. 5 is a flow diagram illustrating the processing of the generate query parameters component of the ranking system in one embodiment. The component generates a query parameter for each query to normalize the contribution of each query derived from the number of resultant documents of the query such as the number of instance pairs in the various ranks. In block 501, the component selects the next query. In decision block 502, if all the queries have already been selected, then the component continues at block 508, else the component continues at block 503. In block 503, the component selects the next instance pair of the selected query. In decision block 504, if all the instance pairs of the selected query have already been selected, then the component continues at block 506, else the component continues at block 505. In block 505, the component increments a count of instance pairs for the selected query and then loops to block 503 to select the next instance pair. In decision block 506, if the total count of the instance pairs for the selected query is greater than the maximum count encountered so far, then the component continues at block 507, else the component loops to block 501 to select the next query. In block 507, the component sets the maximum count to the count of the selected query and then loops to block 501 to select the next query. In block 508, the component sets a query parameter for each query to the maximum count divided by the count for that query and then returns. One skilled in the art will appreciate that various techniques may be used to calculate a query parameter. For example, the query parameter may vary non-linearly based on the number of document or instance pairs, may vary based on the number of relevant documents, and so on.

Figure 6:
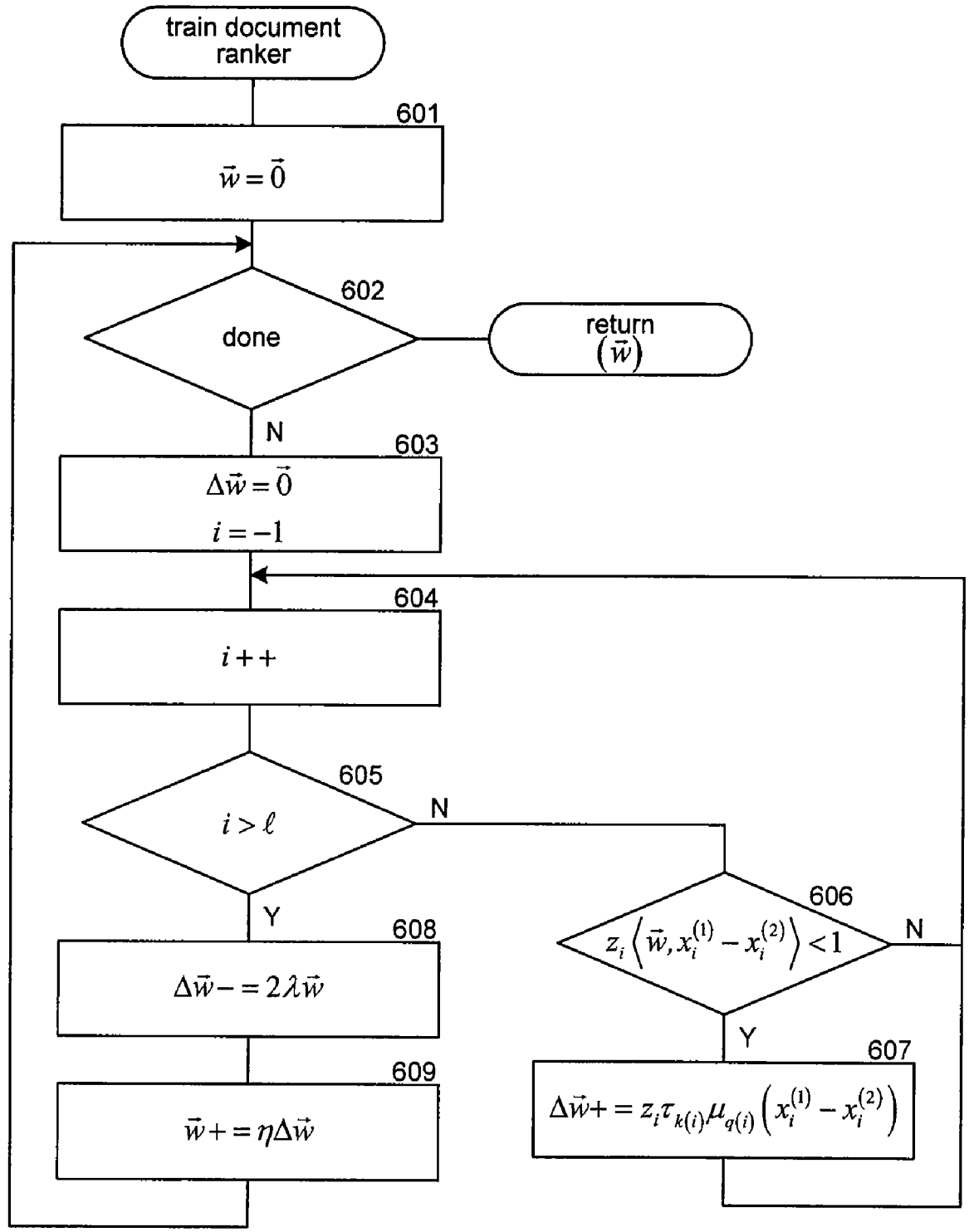
FIG. 6 is a flow diagram that illustrates the processing of the train document ranker component of the ranking system in one embodiment.

FIG. 6 is a flow diagram that illustrates the processing of the train document ranker component of the ranking system in one embodiment. The train document ranker component implements the gradient descent algorithm as described above. In block 601, the component initializes the weighting parameters or weights for the feature vectors to the zero vector. In decision block 602, if a termination condition has been satisfied, then the component returns the weights, else the component continues at block 603. In block 603, the component initializes a change in weights to the zero vector and initializes an index. In blocks 604-607, the component loops calculating a change in the feature vector attributed to incorrectly ranked instance pairs. In block 604, the component selects the next instance pair. In decision block 605, if all the instance pairs have already been selected, then the component continues at block 608, else the component continues at block 606. In decision block 606, if the current weights result in an incorrect ranking, then the component continues at block 607, else the component continues at block 604 to select the next instance pair. In block 607, the component calculates an adjustment to the weights factoring in the rank pair parameter and the query parameter for the selected instance pair and then loops to block 604 to select the next instance pair. In block 608, the component adjusts the value of the change in weights based on the regularizer. In block 609, the component sets the new current value of the weights to the old current value plus the change in weights adjusted by a learning factor. The component then loops to block 602 to determine whether the training is complete, for example, when the adjustments converge to zero or after a fixed number of iterations. One skilled in the art will appreciate many different training techniques can be used to train a ranking function such as adaptive boosting, neural networks, and so on.

Figure 7:
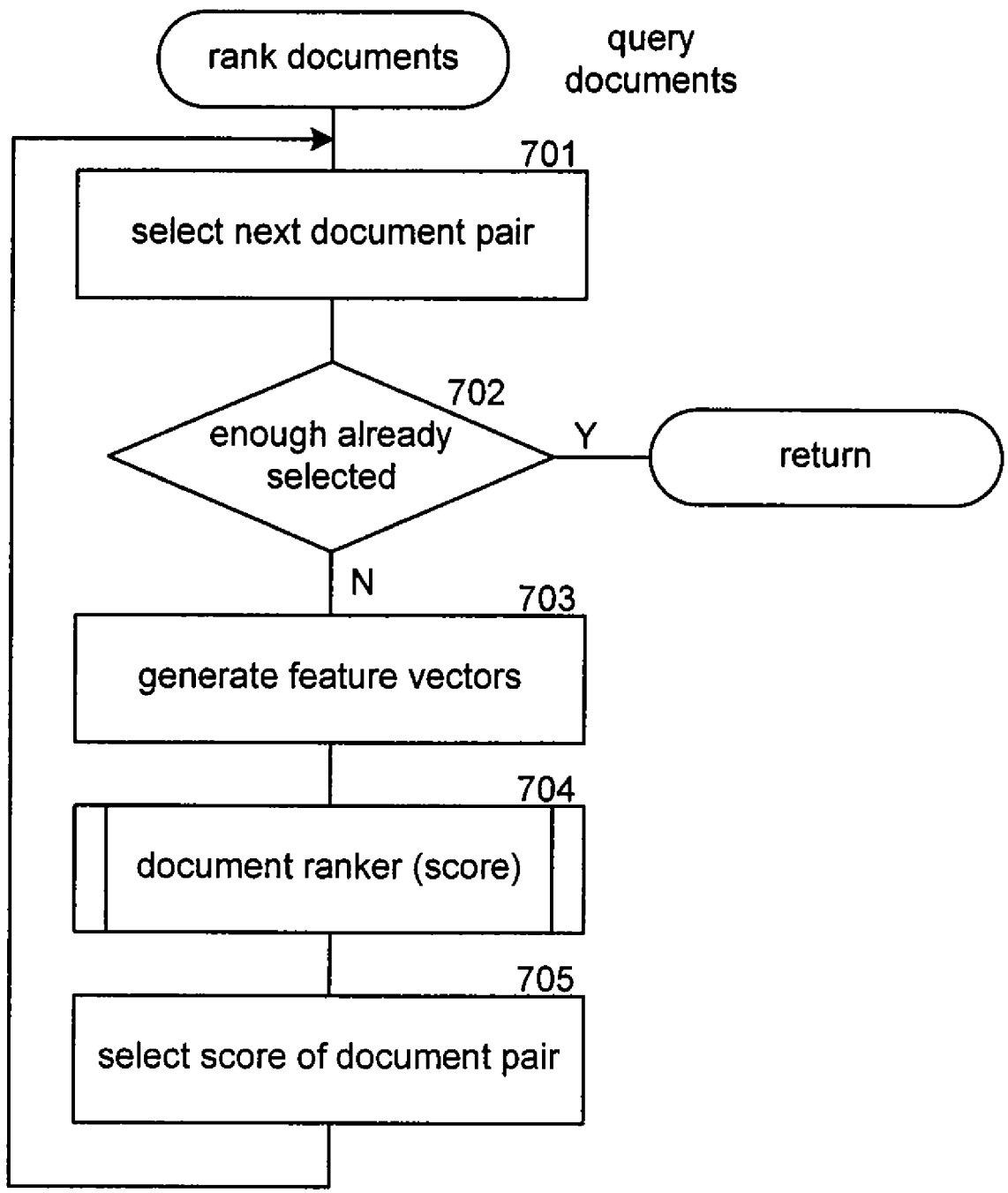
FIG. 7 is a flow diagram that illustrates the processing of the rank documents component of the ranking system in one embodiment.

FIG. 7 is a flow diagram that illustrates the processing of the rank documents component of the ranking system in one embodiment. The component is passed a query and resultant documents and generates a ranking for the documents. In block 701, the component selects the next document pair. In decision block 702, if sufficient document pairs have already been selected, then the component returns, else the component continues at block 703. In block 703, the component generates a feature vector for the documents of the selected document pair. In block 704, the component invokes the document ranker component to generate a rank for the selected documents relative to each other. In block 705, the component sets the rank of the selected document pair to the returned rank and then loops to block 701 to select the next document pair. At each iteration, the component may select the higher ranked document of the selected pair from the last iteration and use that as one of the documents of the pair for this iteration. In this way, the component will converge on selecting the most relevant documents. The other document may be selected randomly from documents that have not yet been selected. Alternatively, the component may use Equation 2 to generate a score for each document indicating the relevance of the document to the query. The component can then rank the documents according to their scores.

Figure 8:
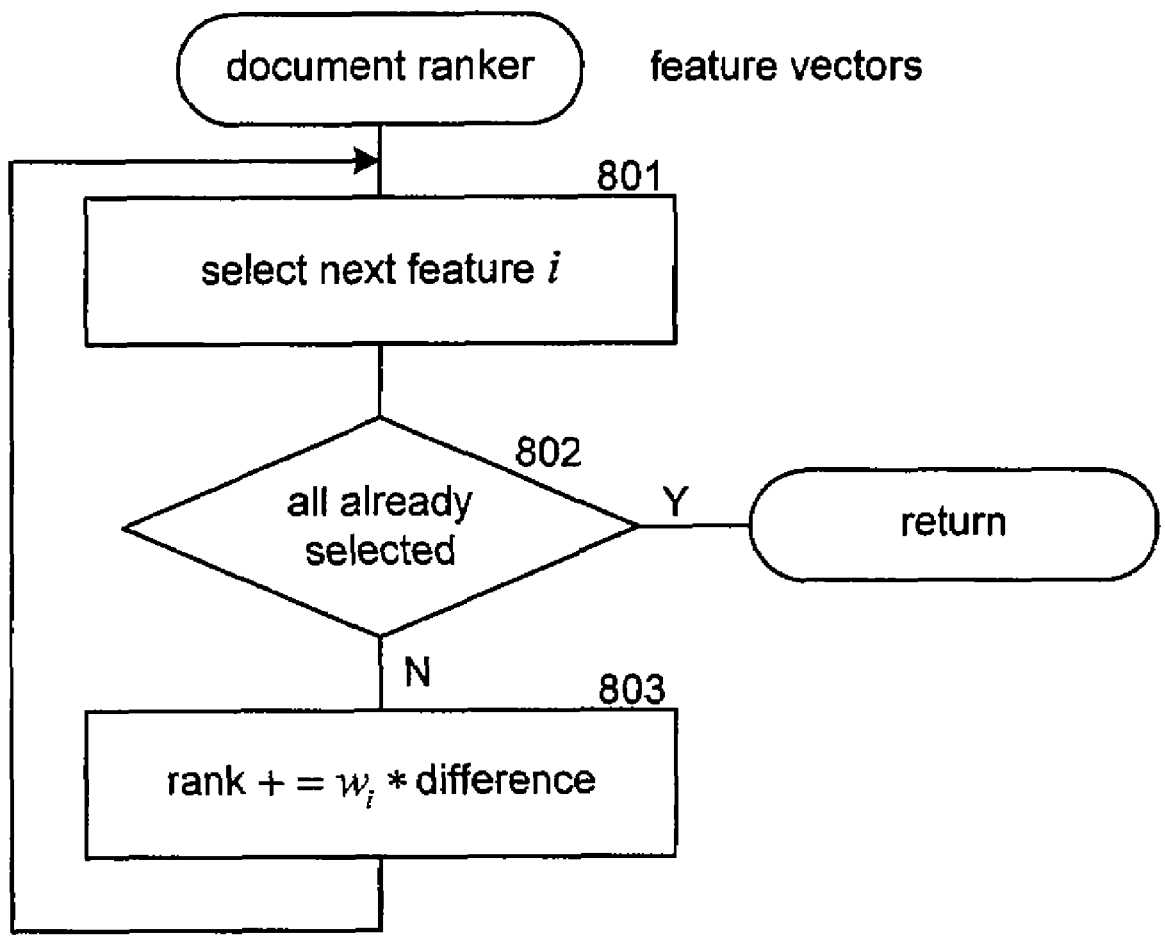
FIG. 8 is a flow diagram that illustrates the processing of the document ranker component of the ranking system in one embodiment.

FIG. 8 is a flow diagram that illustrates the processing of the document ranker component of the ranking system in one embodiment. The component is passed feature vectors for a pair of documents and returns a score of the correct relative ranking of the documents. In block 801, the component selects the next feature of the feature vectors. In decision block 802, if all the features have already been selected, then the component returns the score, else the component continues at block 803. In block 803, the component increments the score by the weight of the selected feature times the difference in the values of the selected feature of the passed feature vectors. The component then loops to block 801 to select the next feature.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. The ranking system may be used to rank a variety of different types of documents. For example, the documents may be web pages returned as a search result by a search engine, scholarly articles returned by a journal publication system, records returned by a database system, news reports of a news wire service, and so on. Accordingly, the invention is not limited except as by the appended claims.

We claim:

1. A computer system for generating a ranking function to rank relevance of a document to a query, comprising:
    a processor; and
    a memory for storing
        a collection of queries, resultant documents, and relevance of each resultant document to its query, the collection being generated by submitting the queries to a search engine with search results for each query being the resultant documents for that query and inputting the relevance of each resultant document to its query; and
        an application program for execution by the processor comprising:
            a component that trains a ranking function using the resultant documents and their relevances by weighting incorrect rankings of relevant resultant documents more heavily than incorrect rankings of not relevant resultant documents so that the ranking function more correctly ranks relevant resultant documents than it does not relevant resultant documents, wherein a different weighting is used for each rank pair where a rank pair represents a combination of two different relevance classifications, the ranking function being trained by
                for each resultant document, generating a feature vector of features for the resultant document,
                for each query, generating ordered pairs of resultant documents with different relevances;
                for each feature, initializing a current weighting parameter for the feature, the current weighting parameters forming the ranking function; and
                modifying the current weighting parameters of the ranking function by iteratively applying the ranking function with current weighting parameters to the feature vectors of each pair of resultant documents and when the ranking for the resultant documents of a pair is in error, adjusting the weighting parameters by comparing an evaluation measure of incorrect rankings of documents to an evaluation measure of correct rankings of the documents, wherein the weighting is set to an average of differences between the evaluation measure of the correct ranking and the evaluation measure of the incorrect rankings, such that an error in ranking is weighted more heavily when a resultant document with a higher relevance is ranked incorrectly than when a resultant document with a lower relevance is ranked incorrectly; and
            a component that ranks relevance of a document to a query that is not part of the collection
            wherein the component that trains the ranking function uses a gradient descent algorithm.

2. The computer system of claim 1 including a component that generates training data from queries, documents, and relevances, the training data comprising feature vectors and labels, each feature vector being derived from a query and a resultant document, each label indicating correct ordering of relevance of a pair of resultant documents of a query.

3. The computer system of claim 1 wherein the relevance classifications are relevant, partially relevant, and irrelevant.

4. The computer system of claim 1 wherein the evaluation measure is selected from the group consisting of mean reciprocal rank, winner take all, mean average precision, and normalized discounted cumulative gain.

5. A computer-readable storage medium containing instructions for controlling a computing system to generate a ranking function to rank relevance of a document to a query, by a method comprising:

providing a collection of queries, resultant documents, and relevance of each resultant document to its query, the collection being generated by submitting the queries to a search engine with search results for each query being the resultant documents for that query and inputting the relevance of each resultant document to its query; and training a ranking function using the resultant documents and their relevances by weighting incorrect rankings of relevant resultant documents more heavily than incorrect rankings of not relevant resultant documents so that the ranking function more correctly ranks relevant resultant documents than it does not relevant resultant documents, wherein a different weighting is used for each rank pair where a rank pair represents a combination of two different relevance classifications, the ranking function being trained by for each resultant document, generating a feature vector of features for the resultant document, for each query, generating ordered pairs of resultant documents with different relevances;

for each feature, initializing a current weighting parameter for the feature, the current weighting parameters forming the ranking function; and modifying the current weighting parameters of the ranking function by iteratively applying the ranking function with current weighting parameters to the feature vectors of each pair of resultant documents and when the ranking for the resultant documents of a pair is in error, adjusting the weighting parameters by comparing an evaluation measure of incorrect rankings of documents to an evaluation measure of correct rankings of the documents, wherein the weighting is set to an average of differences between the evaluation measure of the correct rankings and the evaluation measure of the incorrect rankings, such that an error in ranking is weighted more heavily when a resultant document with a higher relevance is ranked incorrectly than when a resultant document with a lower relevance is ranked incorrectly; and ranking relevance of a document to a query that is not part of the collection wherein the training of the ranking function uses a gradient descent algorithm.

6. The computer-readable storage medium of claim 5 including generating training data from queries, documents, and relevances, the training data comprising feature vectors and labels, each feature vector being derived from a query and a resultant document, each label indicating correct ordering of relevance of a pair of resultant documents of a query.

7. The computer-readable storage medium of claim 5 wherein the relevance classifications are relevant, partially relevant, and irrelevant.

8. The computer-readable storage medium of claim 5 wherein the evaluation measure is selected from the group consisting of mean reciprocal rank, winner take all, mean average precision, and normalized discounted cumulative gain.

* * * * *